(12) United States Patent
Adamczyk et al.

(10) Patent No.: US 7,505,482 B2
(45) Date of Patent: Mar. 17, 2009

(54) APPLICATION SERVICES INFRASTRUCTURE FOR NEXT GENERATION NETWORKS

(75) Inventors: Maria Adamczyk, Alpharetta, GA (US); Michael Denny, Sharpsburg, GA (US); Nicholas Steven Huslak, Duluth, GA (US); Myranda Johnson, Smyrna, GA (US); Abdi Modarressi, Lawrenceville, GA (US); Hong Nguyen, Atlanta, GA (US); Gregory Patterson, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 780 days.

(21) Appl. No.: 10/989,036

(22) Filed: Nov. 15, 2004

(65) Prior Publication Data

US 2006/0104306 A1 May 18, 2006

(51) Int. Cl.
  *H04J 3/16* (2006.01)
(52) U.S. Cl. ...................... 370/469; 370/252
(58) Field of Classification Search ............... 370/252, 370/401, 465, 466, 469
  See application file for complete search history.

(56) References Cited

U.S. PATENT DOCUMENTS

| | | | |
|---|---|---|---|
| 5,717,747 A * | 2/1998 | Boyle et al. | 379/201.03 |
| 2003/0021265 A1 * | 1/2003 | Kumar | 370/354 |
| 2004/0216147 A1 * | 10/2004 | Yanosy et al. | 719/328 |
| 2005/0043038 A1 * | 2/2005 | Maanoja et al. | 455/456.1 |
| 2005/0055310 A1 * | 3/2005 | Drewett et al. | 705/50 |
| 2007/0100981 A1 * | 5/2007 | Adamczyk et al. | 709/223 |

OTHER PUBLICATIONS

U.S. Appl. No. 10/719,270, filed Nov. 21, 2003, Adamczyk et al.
Dianda et al. "Session Initiation protocol Services Architecture" *Bell Labs Technical Journal*7(1): 3-23 (2002).
DSL Forum, Working Text WT-081 Straw Ballot Revision (7), "DSL Evolution—Architecture Requirements for the Support of Q0S-Enabled IP Services" for Architecture & Transport Working Group, 46 pages (Mar. 2003).
ETSI "Open Service Access (OSA); Application Programming Interface (API); Part 1: Overview (Parlay 3)" (2003).
ETSI "Open Service Access (OSA); Application Programming Interface (API);Part 2: Common Data Definitions (Parlay 3)" (2003).

(Continued)

*Primary Examiner*—Firmin Backer
*Assistant Examiner*—Christine Ng
(74) *Attorney, Agent, or Firm*—Myers Bigel Sibley & Sajovec

(57) ABSTRACT

Support of a plurality of different applications utilizing a next generation network having a network layer is provided by an application services middle layer between the applications and the network layer that includes a plurality of common infrastructure elements usable by the different applications. The common infrastructure elements provide services associated with use of the network and services that are not associated with use of the network. The common infrastructure elements may provide a common infrastructure element to an end user such that use of the service by the end user is accessible to each of the different applications utilizing the at least one common infrastructure element. A common infrastructure element may be accessible by an end user so as to provide a common infrastructure element to the end user for the different applications. The different applications may include both third party applications and network service provider applications.

1 Claim, 11 Drawing Sheets

OTHER PUBLICATIONS

ETSI "Open Service Access (OSA); Application Programming Interface (API); Part 5: User Interaction SCF(Parlay 3)" (2003).
ETSI "Open Service Access (OSA); Application Programming Interface (API); Part 6: Mobility SCF(Parlay 3)" (2003).
ETSI "Open Service Access (OSA); Application Programming Interface (API); Part 7: Terminal Capabilities SCF (Parlay 3)" (2003).
ETSI "Open Service Access (OSA); Application Programming Interface (API); Part 8: Data Session Control SCF (Parlay 3)" (2003).
ETSI "Open Service Access (OSA); Application Programming Interface (API); Part 9: Generic Messaging SCF (Parlay 3)" (2003).
ETSI "Open Service Access (OSA); Application Programming Interface (API); Part 10: Connectivity Manager SCF(Parlay 3)" (2003).
ETSI "Open Service Access (OSA); Application Programming Interface (API); Part 11: Account Management SCF(Parlay 3)" (2003).
ETSI "Open Service Access (OSA); Application Programming Interface (API); Part 12: Charging SCF(Parlay 3)" (2003).
ETSI "Open Service Access (OSA); Application Programming Interface (API); Part 1: Overview (Parlay 4)" (2003).
ETSI "Open Service Access (OSA); Application Programming Interface (API); Part 2: Common Data Definitions (Parlay 4)" (2003).
ETSI "Open Service Access (OSA); Application Programming Interface (API); Part 3: Framework (Parlay 4)" (2003).
ETSI "Open Service Access (OSA); Application Programming Interface (API); Part 4: Call Control; Sub-Part 1: Call Control Common Definitions (Parlay 4)" (2003).
ETSI "Open Service Access (OSA); Application Programming Interface (API); Part 4: Call Control; Sub-Part 2: generic Call Control SCF (Parlay 4)" (2003).
ETSI "Open Service Access (OSA); Application Programming Interface (API); Part 4: Call Control; Sub-Part 3: Multi-Party Call Control SCF (Parlay 4)" (2003).
ETSI "Open Service Access (OSA); Application Programming Interface (API); Part 4: Call Control; Sub-Part 4: Multi-Media Call Control SCF (Parlay 4)" (2003).
ETSI "Open Service Access (OSA); Application Programming Interface (API); Part 4: Call Control; Sub-Part 5: Conference Call Control SCF (Parlay 4)" (2003).
ETSI "Open Service Access (OSA); Application Programming Interface (API); Part 5: User Interaction SCF (Parlay 4)" (2003).
ETSI "Open Service Access (OSA); Application Programming Interface (API); Part 6: Mobility SCF (Parlay 4)" (2003).
ETSI "Open Service Access (OSA); Application Programming Interface (API); Part 7: Terminal Capabilities SCF (Parlay 4)" (2003).
ETSI "Open Service Access (OSA); Application Programming Interface (API); Part 8: Data Session Control SCF (Parlay 4)" (2003).
ETSI Open Service Access (OSA); Application Programming Interface (API); Part 9: generic Messaging SCF.
ETSI "Open Service Access (OSA); Application Programming Interface (API); Part 10: Connectivity manager SCF (Parlay 4)" (2003).
ETSI "Open Service Access (OSA); Application Programming Interface (API); Part 11: Account Management SCF (Parlay 4)" (2003).
ETSI "Open Service Access (OSA); Application Programming Interface (API); Part 12: Charging SCF (Parlay 4)" (2003).
ETSI "Open Service Access (OSA); Application Programming Interface (API); Part 13: Policy Management SCF (Parlay 4)" (2003).
ETSI Open Service Access (OSA); Application Programming Interface (API); Part 14: Presence and Availability Management SCF (2003).
ETSI "Open Service Access (OSA); Application Programming Interface (API); Part 2: Common Data Definitions (Parlay 3)" (2003).
ETSI "Open Service Access (OSA); Application Programming Interface (API); Part 3: Framework (Parlay 3)" (2003).
Lozinski et al. "Parlay/OSA—a New Way to Create Wireless Services" *IEC Mobile Wireless Data* May 15, 2003, revised Jun. 2003.
Lucent Technologies "Supports multiple Applications by Providing Traditional Telephony and Non-Telephony Services: Cost Savings and Revenue Generating Capabilities are Driving the Migration of Voice Services to Voice over Internet Protocol" *IP Multimedia Subsystems (IMS) Service Architecture* (2004).
Microsoft Corportation "Microsoft Service Delivery Platform Technical Overview" 18 pages (Oct. 2003).
Parlay APIs 4.0 "Parlay X Web Services: White Paper" Version 1.0, 12 pages, Dec. 16, 2002.
Parlay for Java: White Paper, version 1.1, 6 pages, Feb. 24, 2003.
Parlay Java API Realization Working Group "Parlay UML to Java API Rulebook: Part 1: For the J2SE Environment" Issue 1.1, 32 pages, Feb. 24, 2003.

* cited by examiner

APPLICATION SERVICES INFRASTRUCTURE FOR NEXT GENERATION NETWORKS

FIELD OF THE INVENTION

This invention relates to communications networks, and more particularly to next generation networks.

BACKGROUND OF THE INVENTION

FIG. 1 is a conceptual diagram of a conventional four layer architecture for network communications, such as that on which the Internet is built. As seen in FIG. 1, an application layer is provided that uses the services of a network layer. The network layer uses the services of a data link layer which uses the services of a physical layer. Each layer provides a level of abstraction such that the layer above it does not need to know the details of the layer(s) below. For example, the application layer needs to know the details of how to communicate with the network layer but does not need to know the details of the data link layer or the physical layer. Thus, the applications in the application layer and the users need not know the details of the connectivity network in order to communicate over it.

The current and evolving paradigm of IP application development treats the Internet (and subtending intranets) as a ubiquitous connectivity infrastructure and designs and implements each application at its edge in an autonomous manner, complete with all the supporting capabilities that the application needs. In this paradigm, the degree of convergence has advanced to encompass ubiquitous IP connectivity, in contrast to the older paradigm in which different types of applications would use their own connectivity/transport infrastructure (voice telephony on wired and wireless circuit switched networks, video on Digital Broadcast Satellite (DBS) and Hybrid Fiber Coax (HFC) infrastructures, email/IM and information services on the Internet, signaling and control on SS7, etc.). Many current Internet applications are developed and offered by entities that do not own a connectivity infrastructure. Instead, these applications run on other networks such as the public Internet (which is a best effort connectionless delivery mechanism). Such entities are often called third party service providers—to distinguish them from the Network Service Providers (NSPs)—and their applications are called third party applications. This state of application architecture is depicted in FIG. 2 where the application layer of FIG. 1 is decomposed into a collection of substantially independent application stacks. The collection of shapes in each application stack represent a set of supporting features/capabilities needed by the application for its proper functioning. Many of these supporting capabilities may be common across different applications as indicated in FIG. 2.

The convergence of connectivity/transport technologies has resulted in work in developing Next Generation Networks. The term Next Generation Networks (NGN) is used herein to refer to a fully converged network that provides a variety of advanced services (e.g., voice, video, data, signaling/control, management, connectivity, etc.). A service is a set of well-defined capabilities offered to customers (who can be end users or other service providers that may enhance the service and offer it to end users) and for which customers can potentially be billed. From a service provider's perspective, a service can emanate from any layer of the architecture. For example, physical layer services could include leasing of physical media like fiber to customers by facility-based providers. Data link services can provide layer 2 switched point to point connectivity, e.g., an ATM Permanent Virtual Circuit (PVC) between two customer locations. Network services emanate from the network layer and provide routed connectivity to customers, e.g., a network based Virtual Private Network (VPN) service. Application services are offered to customers from the application layer, for example VoIP, video on demand, etc. Any service above the physical layer would transparently use the services of lower layers (either from the same provider or a different provider) in ways that are typically not visible to the customer.

Several efforts to support application services on NGNs have been proposed. For example, the IP Multimedia Core Network Subsystem (IMS) is an architectural framework specified by 3GPP ($3^{rd}$ Generation Partnership Project) as a foundation for IP-based services in third generation mobile systems. Its specifications are being created as an evolved part of the GSM Core Network (CN). Its design objective is to efficiently support applications involving multiple media components, such as video, audio, and tools like shared online whiteboards, with the possibility to add and drop component(s) during the session. These applications are called IP Multimedia applications (or "services"), and are based on an Internet Engineering Task Force (IETF) defined session control capability, which, along with multimedia bearers, utilizes the IP-Connectivity Access Network (this may include an equivalent set of services to the relevant subset of Circuit-Switched services).

The IMS may enable PLMN (Public Land Mobile Network) operators to offer to their subscribers, multimedia services based on and built upon Internet applications, services and protocols. Such services may be developed by PLMN operators and/or other third party suppliers including those in the Internet space using the mechanisms provided by the Internet and the IMS. IMS may enable the convergence of, and access to, voice, video, messaging, data and web-based technologies for the wireless user, and combine the growth of the Internet with the growth in mobile communications.

Support of these applications is based on the principle that the network is able to dissociate different flows within the multimedia session. These flows are typically used to carry the data resulting from the different media components of the application, and so have different Quality of Service characteristics. As the network becomes aware of these characteristics, a more efficient handling of the resources is possible. It also enables the networks to dissociate the session negotiation from the establishment of bearers.

In order to achieve access independence and maintain good interoperability with wireline terminals across the Internet, the IP multimedia subsystem attempts to be conformant to IETF Internet standards and relevant Requests for Comments (RFCs). Therefore, the interfaces specified do conform, as far as possible, to IETF standards for the cases where an IETF protocol has been selected, e.g., SIP.

To transport IMS signaling and user data, IMS entities use the bearer services provided by the PS (Packet Switched) domain and the Radio Access Network, referred to as the "bearer network" in the IMS specifications. With some exceptions, the PS domain and the Access Network consider IMS signaling and IMS applications flows as user data flows, hence the minimum impact on non-IMS entities. As part of the bearer services offered by the PS domain to the IMS, the PS domain supports the handover functionality for maintaining service continuity while the terminal changes location.

The complete solution for the support of IP multimedia applications includes terminals, IP-Connectivity Access Networks (IP-CAN), and the functional elements of IMS. An example of an IP-Connectivity Access Network is the GPRS core network with GERAN (GPRS/EDGE) and/or UTRAN (UMTS Radio Access Networks). The IP multimedia subsystem utilizes the IP-CAN to transport multimedia signaling and bearer traffic. The IP-CAN maintains the service while the terminal moves and hides these moves from the IP multimedia subsystem.

The IMS architecture has been designed to allow services to be provided by both the Home Network (which contains the user's IMS subscription) and by the Local Network (or visited network, which allows IMS subscriber access through a trust relationship with the home network).

Within the Home Network, the IMS will support IMS subscriber access to both operator-provided services (such as CAMEL-based and SIP-based), as well as third party-provided OSA-based services (through the provision of an OSA/Parlay API between the third party Application Server (AS) and the network).

Within the Local (visited) Network, the IMS can provide services of a local nature to visiting users (inbound roamers). There will be a standardized mechanism to access these local services, and the mechanism to access local services shall be exactly the same for home users and inbound roamers. There will also be a standardized mechanism for the UE (User Equipment) that is registered in the IMS, to receive and/or retrieve information about the available local services. It also will be possible to advertise local services to a registered UE, independent of whether the UE has an active SIP session. Local services may be presented e.g., by directing the user to a web page.

The IMS architecture is based on the principle that the service control of Home subscribed services for a roaming subscriber is in the Home network, e.g., the Serving-CSCF is located in the Home network. The IMS network architecture is illustrated in FIG. 3. Services can be provided within two possible scenarios: The service platform (AS) can be located either in the Home Network, or in an external service platform. The external service platform (OSA-AS) could be located in either the visited network or in a third party platform. The standardized way for secure third party access to IMS services is via the OSA framework. In these scenarios, the roles that the CSCF plays are described as follows. The Proxy-CSCF shall enable the session control signaling to be passed to the Serving-CSCF. The Serving-CSCF is located in the home network and shall invoke the service logic.

Referring to FIG. 3, the IMS may include the following entities:

Proxy-Call Session Control Function (P-CSCF): this is the "first contact point" of IMS. It is located in the same network as the GGSN (visited or home network, shown as being in the visited network in FIG. 3). Its main task is to select the I-CSCF of the Home Network of the user. It also performs some local analysis (e.g., number translation, QoS, admission control, policing, . . . ).

Interrogating-CSCF (I-CSCF): this is the "main entrance" to the home network: it selects (with the help of HSS) the appropriate S-CSCF.

Serving-CSCF (S-CSCF): it performs the actual session control: it handles the SIP requests, performs the appropriate actions (e.g., requests the home and visited networks to establish the bearers), and forwards the requests to the S-CSCF/external IP network of other end users as applicable. The S-CSCF might be specialized for the provisioning of a (set of service(s).

In addition, the interworking functions and entities, not shown in FIG. 3, are defined for interconnection with legacy networks (PSTN, GSM, GSM+GPRS, UMTS, etc.) as BGCF, IM-MGW, and so on. Note that from Release 5 onwards, the name of HLR has been changed into "HSS" (Home Subscriber Server) to emphasize that this database contains not only location-related data but also subscription-related data, like the list of services the user is able to get and the associated parameters.

From the perspective of dynamic behavior, the following is an order of events: a PS-domain bearer (a PDP context in GPRS) must be established, for use in conveying the IMS signaling between the UE and the S-CSCF; and other PS-domain bearers are established between the UE and the other end-party to transport the data generated by the IMS application.

FIG. 4 provides a Functional Model of 3GPP Release 6 entities and their relationships, showing the Circuit-Switched (CS) domain, the Packet-Switched (PS) domain, the CAMEL Service Environment (CSE), the IP Multimedia Core Network Subsystem (IMS), as well as other non-core elements.

In addition to IMS, a Joint Working Group composed of the ETSI TISPAN OSA Project, 3GPP, 3GPP2, the Parlay Group, and some member companies of the JAIN community, has been drafting an Application Programming Interface (API) specification for third party service applications, known as the Open Service Access API, or OSA/Parlay API. Using this API, application service developers may access and utilize network functionality offered by network operators through an open, standardized interface.

OSA/Parlay is, therefore, a mediator API between telecom networks and third-party applications, and provides a secure interface between network operators and application servers. The Joint Working Group derives its specifications from a UML model of the OSA API. Using the latest document and code generation techniques, the detailed technical description documents, the IDL code, WSDL code, and Java API are all produced from a single source UML model. This ensures alignment between all versions and all formats of the API. ETSI publishes the master specification of the APIs. The Parlay Group point to this published ETSI standard instead of re-publishing the specification.

3GPP maintains its own specification, TS 29.198, which has the same structure as the ETSI specification. Each part of TS 29.198 is a subset or a copy of the ETSI specification. In addition to OSA/Parlay APIs, the Joint Working Group has issued OSA/Parlay X Web Services Specifications. The Parlay X Web Services Specifications define a set of highly abstracted telecommunication capabilities (i.e., a simplified Parlay API) following a simple request/response model using Web Services (SOAP/XML) technologies.

The OSA/Parlay architecture is primarily focused on network and protocol independent service APIs for third party access in fixed and mobile networks as shown in FIG. 5.

The OSA/Parlay APIs are split into three types of interfaces classes:

Interface classes between the OSA/Parlay Applications and Framework, which provide applications with basic mechanisms (e.g., authentications, service discovery, service subscription) that enable them to access the service capabilities in the network.

Interface classes between the OSA/Parlay Applications and Services, which are individual Services that may be required by the OSA/Parlay Application.

Interface classes between the Framework and the Services, which provide the mechanism for multi-vendor deployments.

The Framework API controls access to Services Capabilities, only allowing trusted applications (typically from third parties, or those that have passed its authentication tests), to discover and use the Services offered, and providing basic infrastructure functionality, such as integrity management. Typically, implementations of the Service APIs would sit inside networks, while the Framework would sit somewhere where it has access to the Services, and where applications have access to it. The Framework can host Services provided by different suppliers and even existing within different networks. Using the APIs, applications can be independently deployed of the Service itself. As the applications make use of the Gateway, the actual location of the Services is irrelevant to them.

To provide secure access to service capabilities in the network to third-party applications, the Framework API provides basic mechanisms that must be executed prior to offering and activating applications:

Authentication: the application must be authenticated before it is allowed to use any other OSA/Parlay interfaces.

Authorization: determines what a previously authenticated application is allowed to do. Authentication must precede authorization. Once authenticated, an application is authorized to access certain Service Capability Features.

Discovery: after successful authentication, applications can utilize the available Framework interfaces and the Discovery interface to obtain information on authorized network Service Capability Features. The Discovery interface can be used at any time after successful authentication.

Establishment of service agreement: before an application can interact with a network Service Capability Feature, a service agreement must be established.

Access control: the framework provides access control functions to restrict an application's access to only Service Capability Features and service data for the security level, context, domain, etc. authorized for the application.

The network capabilities are described in Parlay specifications as Services (see FIG. 6).

The OSA/Parlay Framework is a gateway component in support of Services and OSA/Parlay applications. The Service APIs each offer an abstraction of a certain class of features contained within the network, thereby facilitating easier access to network capabilities to applications residing outside of the network. Examples of these Service APIs include Multi Party Call Control, which allows applications to create third-party calls and to intercept calls or call attempts, and Mobility, which allows an application to discover the location and status of an end-user. The Services APIs in Parlay Release 4.1, published in 2003, include Call Control (Generic Call Control, Multi-party, Multimedia, and Conference Call Control), Mobility (User Location and Status), Generic User Interaction, Generic Messaging, Terminal Capabilities, Data Session Control, Connectivity Manager, Presence and Availability Management, Policy Management, Account Management and Charging.

The Microsoft New Services Architecture Service Delivery Platform is a next generation service framework envisioned by Microsoft as the evolution of Service Oriented Architecture (SOA) to support the delivery of new services across devices and networks. A description of the Microsoft SDP is found in the white paper entitled "Microsoft Service Delivery Platform Technical Overview." Microsoft's SDP features include the following:

Session Management for service collaboration that handles the context in which services will interact with one another;

Service Logic that defines how services will be organized as part of a session;

Identity & Security Management for handling the different modes of identity distribution and security between multiple services;

Resource & QoS Management that defines how services will be reserved and allocated and how QoS will be handled at the service level;

Service Catalog that defines the existence and availability of the services and their extended technical description; and Subscriber profile Management for handling the different representations of a subscriber.

In general, SDP is Microsoft's service framework to address the problems associated with services proliferation, heterogeneous environments, multiple administrative domains, loose coupling, and dynamic aggregation. SDP provides a common framework of reusable building block components for application developers to develop and integrate voice and data applications, such as VoIP and VoD integrated infrastructures.

SUMMARY OF THE INVENTION

Embodiments of the present invention provide a system for supporting a plurality of different applications utilizing a next generation network having a network layer. The system includes an application services middleware between the applications and the network layer that includes a plurality of common infrastructure elements usable by the different applications. The common infrastructure elements provide services associated with use of the network and services that are not associated with use of the network.

In particular embodiments of the present invention, at least one of the common infrastructure elements provides a service to at least one application in support of the application's interaction with one or more end users. Furthermore, at least one of the common infrastructure elements may be accessible by an end user so as to provide a common infrastructure element to the end user for the different applications. The different applications may include both third party applications and network service provider applications.

The common infrastructure elements may include one or more of an end user authentication service configured to validate user and/or device credentials for allowing access to the plurality of different applications, a naming/directory service (configured to provide a common information repository, registry service, and application program interface to provide a list of available services from application service providers), a profile service configured to provide to an end user access and management of user account information for the plurality of different applications, a bandwidth/QoS broker configured to allocate preferred service levels to users and/or applications as requested, and to configure the network with the correct behavior for the defined service, a presence service configured to aggregate user and device reachability information, a notification service configured to provide for the plurality of applications to send messages to end users and/or devices, a subscription service configured to allow end users to subscribe to and manage subscriptions to the plurality of different applications, a billing service configured to provide usage records that can be used to generate a consolidated billing function to the plurality of different applications, a session control service configured to manage the context of multi-user, multi-application, and multimedia sessions, a Session Initiation Protocol (SIP) proxy/registrar service (configured as defined in IETF RFC 3261 to processes incoming SIP messages to help route requests to a destination user's current location, authenticate and authorize users for services, implement provider call-routing policies, provide features to users and allow users to upload their current locations for use by proxy servers), a media bridge service configured to support the transport of video, audio and/or data streams between end users and service facilities in a conference, a user interface service configured to provide an interface to end users to the plurality of different applications and/or the common infrastructure elements, and a location service configured to determine an end user's physical position in order to manage mobility, possibly with the help of a Global Positioning System in the user equipment, once it has been determined that the user is active/available on that user equipment and wishes to be part of the communication and a mobility management service configured to provide call/session continuity as a device moves between circuit and packet network domains.

Further embodiments of the present invention provide services for an application middleware layer between a plurality of different applications and a network layer of a next generation network by determining common services used by the plurality of different applications irrespective of whether the common services are associated with use of the next generation network, abstracting the common services to provide a common interface to the services to the plurality of different applications and incorporating the abstracted common services into the middle layer infrastructure.

In particular embodiments of the present invention, determining common services and capabilities, abstracting the common services and incorporating the abstracted common services includes scoping the middle layer, modeling the middle layer services, modeling domains for the middle layer services and generating services provided by the middle layer based on results of scoping the middle layer, modeling the middle layer services and modeling domains for the middle layer services. Scoping the middle layer may include identifying functionality and services provided to the applications, identifying a set of services supported by the middle layer and identifying a set of domains resident in the middle layer. Modeling the middle layer services may include modeling each of the identified services supported by the middle layer, developing a domain chart and developing an activity diagram. Modeling domains may include identifying domains needed for each identified service provided to the applications, determining a union of the identified domains to identify a list of domains needed for the middle layer, developing a mission statement for each domain and developing a class specification for each domain in the union.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
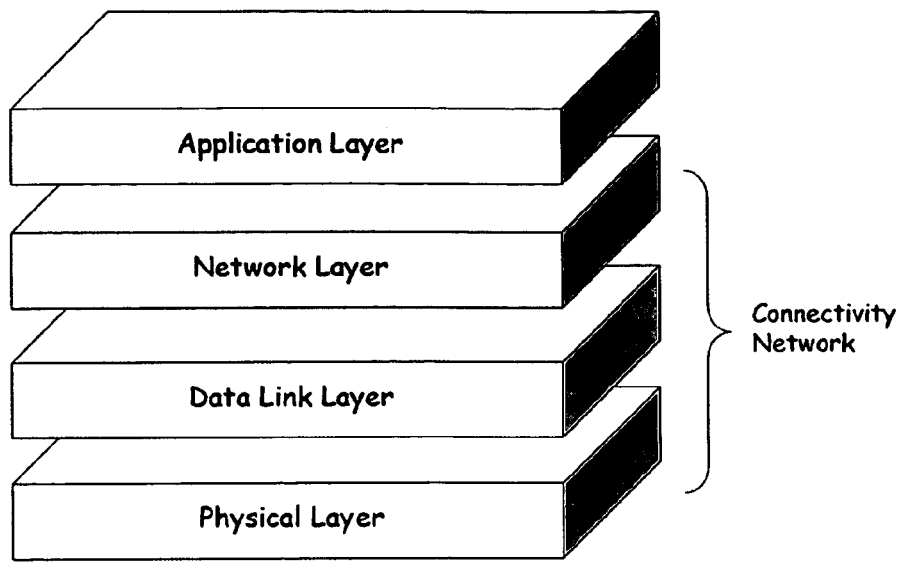
FIG. 1 is a diagram of a conventional four layer architecture for network communications in the internet.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

One cannot predict with any reasonable degree of certainty what application services will survive or indeed flourish in next generation networks. From a customer's viewpoint, however, the overwhelming majority of next generation application services can be cast into one of the following broad categories:

Communication/Collaboration Services: These can be viewed as evolution of current wired or wireless voice telephony on the real-time side, and voicemail/email on the non-real-time side. As voice increasingly becomes another data application with VoIP, existing trends indicate that it may be enhanced initially with useful data-features turning it into a voice-data application, and eventually with capabilities that may transform it into full-fledged voice-data-video communication. Similarly, voicemail, email and instant messaging (IM) may assume more of a multimedia character. The variations and composition of these with other applications may over time give rise to very sophisticated multimedia multi-party application services with powerful collaboration features.

Entertainment/Education Services: This set of application services deals with delivering non-text content to the customer. Video-on-demand, music on demand, multi-player gaming and similar services are all examples in this category, which can be offered either on-demand as streaming applications with sophisticated end-user control or, alternatively, in conjunction with a PVR-like capability on a time-shifted basis.

Data/Information Services: This category represents a "catch all" class and will represent evolution of current Internet usage pattern. At the minimum, application services that fall into this category may include browsing, information retrieval, productivity applications, e-commerce, notification and/or "push"-type services.

Ancillary/Management/Support Services: A special class of data services is especially important when it comes to support of other application services. A large number of next generation end-user-facing applications may not be viable without a set of authentication, billing, security, screening, profile, presence, performance monitoring and similar capabilities to support them and make them easy and convenient to use. These services may have an ancillary, management, or support nature and may or may not generate revenues on their own, but they may be crucial to the successful rollout of next generation application services. One or more of these services may be provided as common infrastructure elements that form a core part of an Application Services Infrastructure (ASI) according to some embodiments of the present invention.

Next generation networks may provide a ubiquitous connectivity and transport infrastructure to address the needs of the application services mentioned above. Thus, some embodiments of the present invention may provide a unified application service infrastructure that will provide middle layer support capabilities that may facilitate rapid, cost effective rollout of sophisticated next generation services.

From the point of view of architecture design (in contrast to the customer's viewpoint), next generation application services can be classified in a different way, bringing out some of their architectural attributes and connectivity requirements:

Conversational Services: These are applications that have low delay and jitter tolerance; their error tolerance can be moderate as in voice, or low as in video. Data rates to support these applications are generally symmetrical and can range from low to high. Real time communication services fall into this category.

Interactive Services: These services typically have a request/response transactional nature exhibiting low tolerance for error and moderate tolerance for delay and jitter. Their bandwidth needs can range from low to high with generally non-symmetrical data rates. Most data/information services and some non-real-time communication services fall into this category.

Streaming Services: These applications have a low tolerance for error and high tolerance for delay and jitter (compensated for by play-out buffers). Their bandwidth needs can range from low to high and their data rates are typically non-symmetrical. Most content delivery and content on-demand services fall into this category.

Background Services: These applications have very little delay or jitter constraints, but require very low error rates. Bulk data transfer, SMS, and a lot of ancillary and management services fall into this class.

A final classification of services is worth mentioning: some services and functionality benefit more from middle layer services than others. These types of services are discussed in Dianda, Janet R. et al, "Session Initiation Protocol Services Architecture", Bell Labs Technical Journal 7(1), 3-23, 2002.

Figure 2:
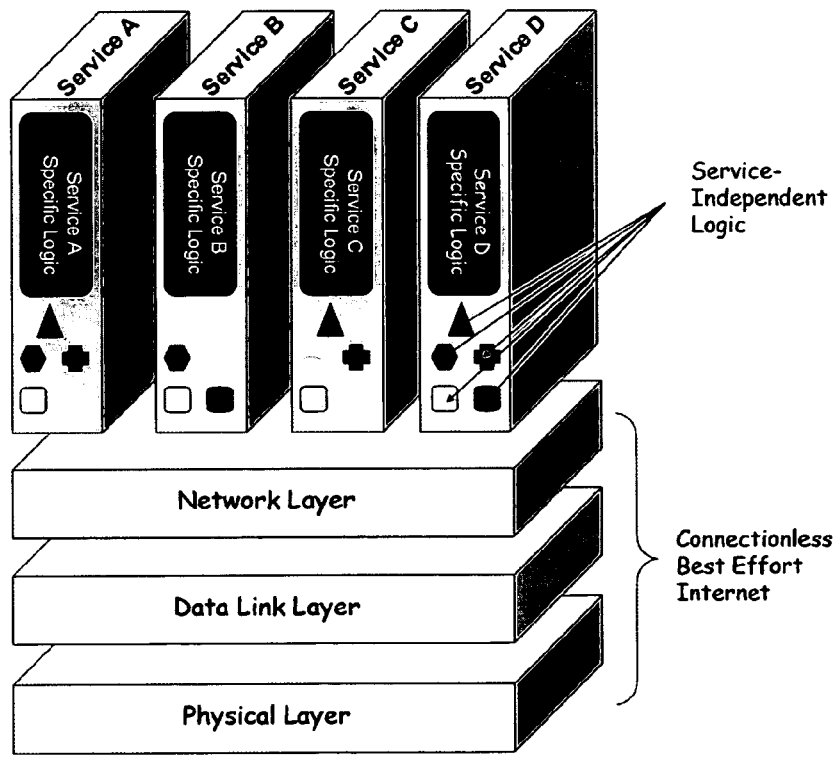
FIG. 2 is a diagram of conventional application development utilizing a "silo" approach in which each application uses its own version of logic elements that are service-independent.
Figure 3:
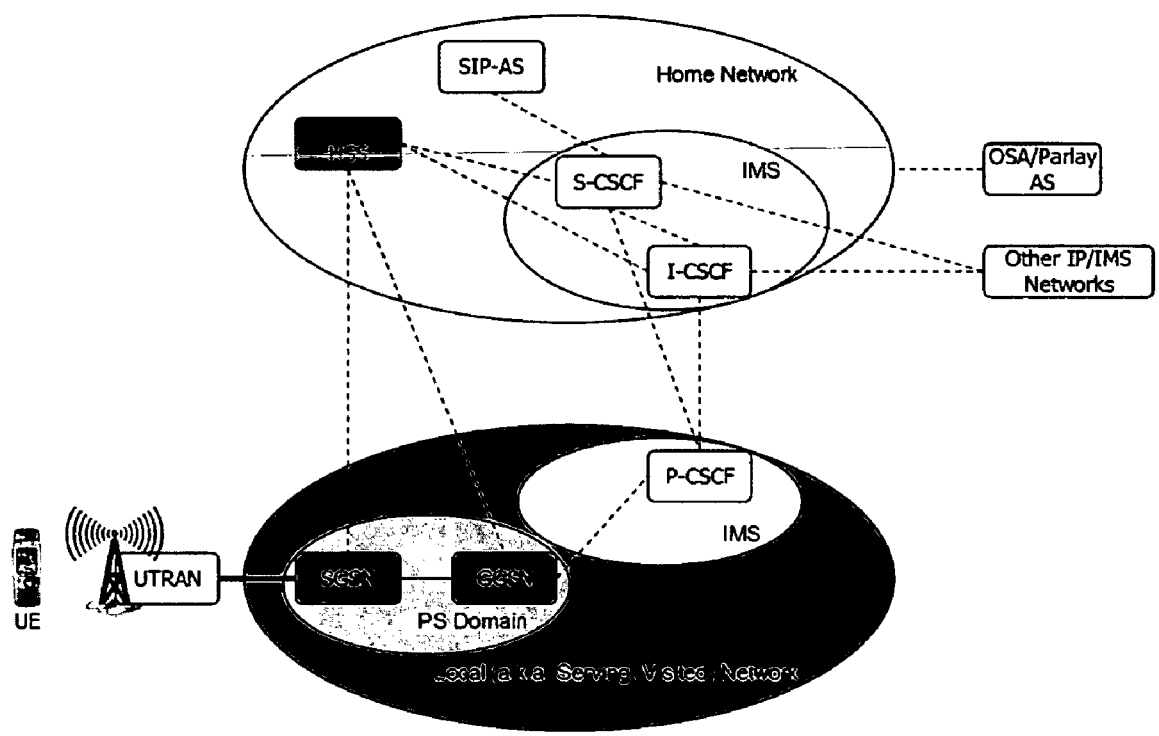
FIG. 3 is a functional diagram of the IMS architecture.
Figure 4:
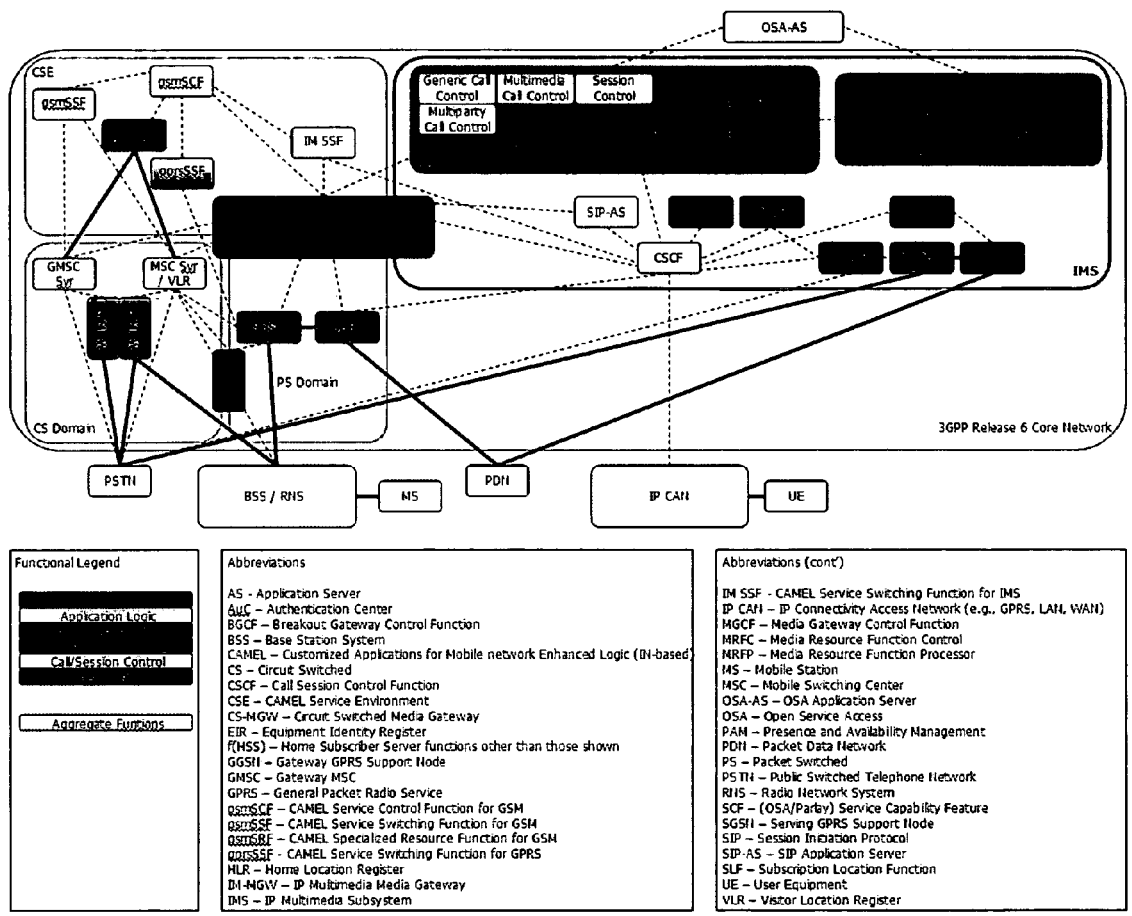
FIG. 4 is a functional diagram of 3GPP Release 6 entities and their relationships, showing the Circuit-Switched (CS) domain, the Packet-Switched (PS) domain, the CAMEL Service Environment (CSE), the IP Multimedia Core Network Subsystem (IMS), as well as other non-core elements.
Figure 5:
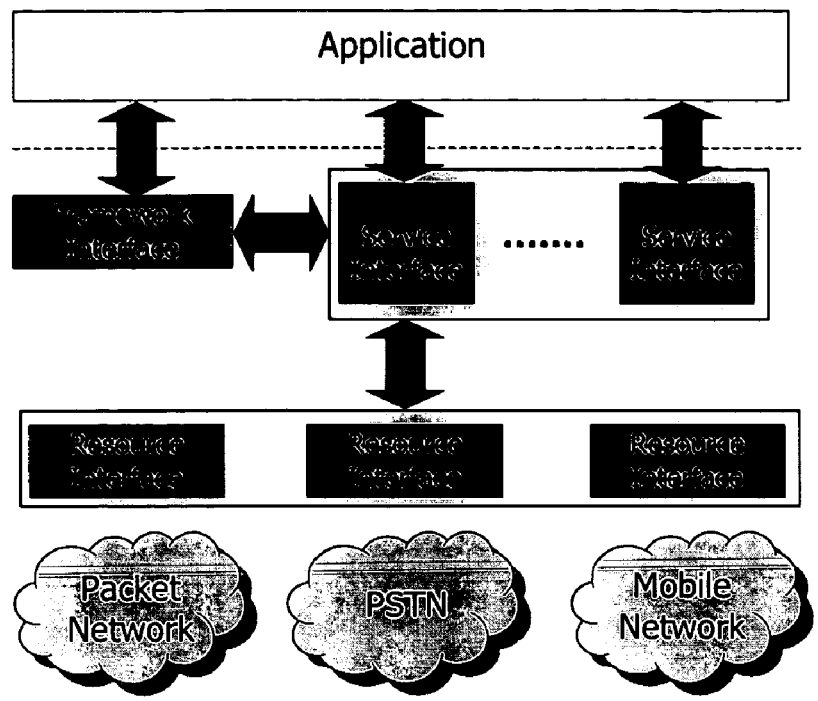
FIG. 5 is a diagram of the OSA/Parlay architecture.
Figure 6:
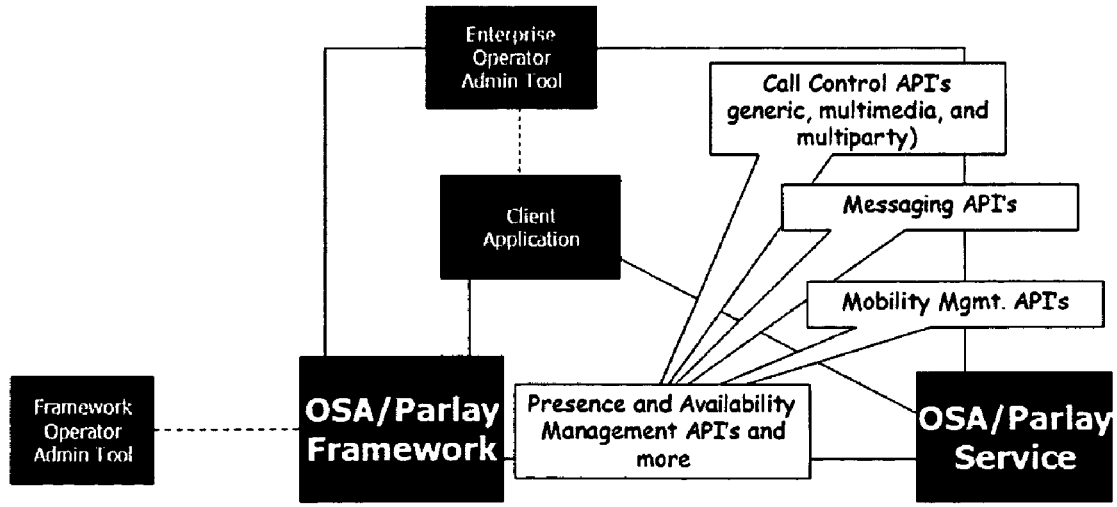
FIG. 6 is a diagram of OSA/Parlay service interfaces.

Embodiments of the present invention provide a middle layer of common infrastructure elements between the application services and the network layer. Such a middle layer approach may be contrasted with the existing paradigm of internet application development depicted in FIG. 2. As seen in FIG. 2, each application comprises all the capabilities required entirely within itself, whether service-specific or service-independent. The fundamental shortcomings of this "silo" model of application development may include the repetitive development of a common capability set needed by a wide range of applications, resulting in unnecessary duplication of effort and wasting of resources. Furthermore, in the silo paradigm, the end users would typically face inconsistent experiences moving from one application to another. Each application service and its required supporting capabilities is typically developed entirely independently of other applications, which may limit inter-working among applications in ways that can enhance users' experience. "Silo" development paradigms may be more expensive in the long run unless one is interested in offering very few application services. Again, this has to do with the multiplicity of development efforts, which typically leads to longer time to market for applications beyond the first few applications. Even when applications are acquired in whole or part, or offered by (hosted) third parties, integration and testing efforts in silo environments may lead to higher costs and longer time intervals. The "silo" model of application development may also deprive the service provider of the opportunity to develop and deploy unified service management capabilities. Finally, the "silo" model of application rollout may also deprive the next generation service provider of the opportunity to change the business model in offering applications by positioning itself as a trusted intermediary.

Figure 7:
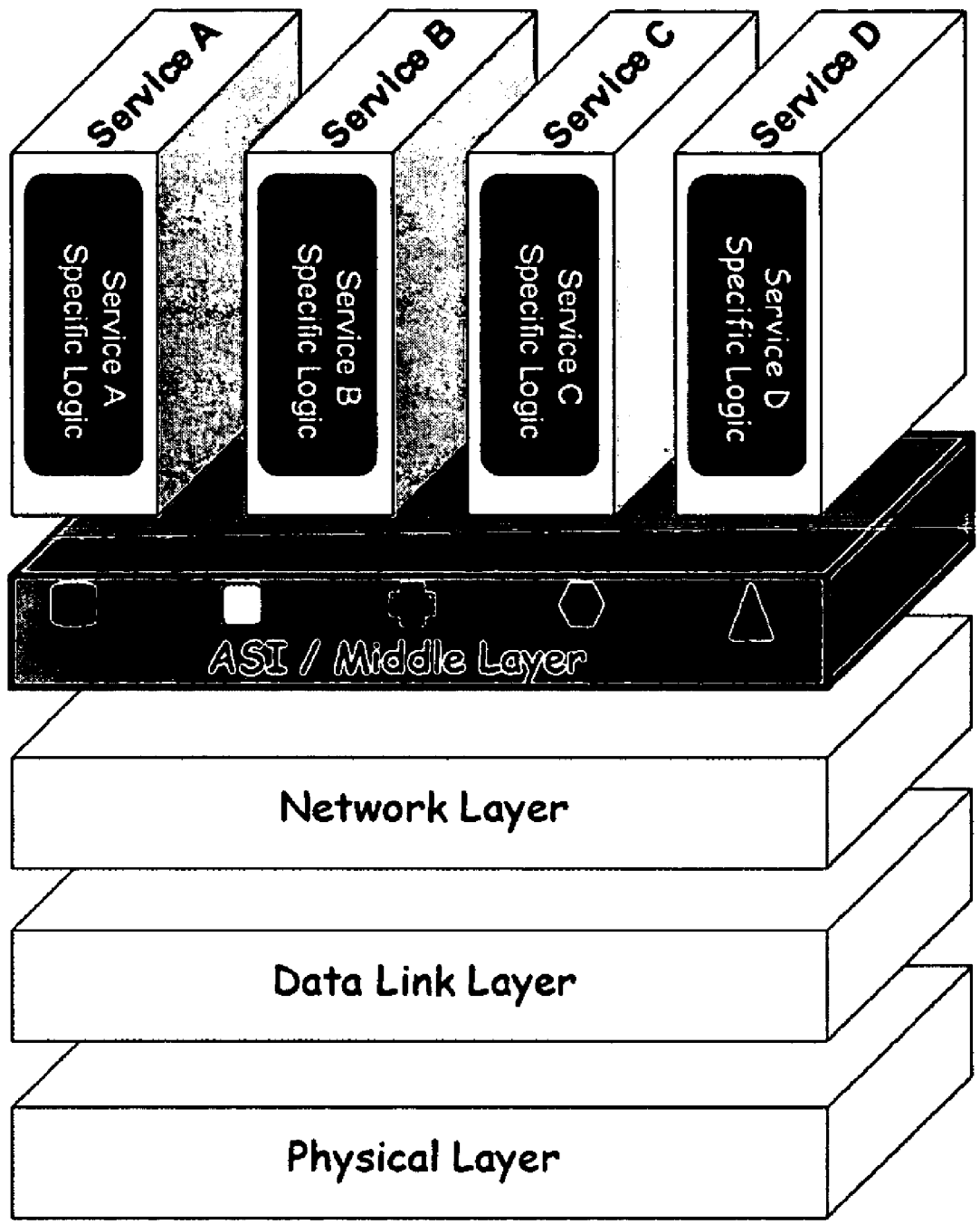
FIG. 7 is a diagram of an application services interface architecture for application development according to some embodiments of the present invention. In contrast with FIG. 2, the common service independent logic elements are collected in this figure in a middle layer.

Embodiments of the present invention provide for an alternative to the "silo" model of application development and rollout. An application services infrastructure according to some embodiments of the present invention is depicted in FIG. 7. As seen in FIG. 7, a set of capabilities that are common across multiple applications (represented in the figure by objects of various shapes) are pulled out of the individual applications, abstracted and architected in a separate distinct layer referred to herein as the ASI/Middle layer. Different applications then use these middle layer support capabilities on a need basis in order to provide the end users with their full range of functionalities. End users can also access some of these middle layer functions independent of particular applications when it makes sense for them to do that. Some generic (i.e., autonomous from any particular application) capabilities provided by the ASI/Middle layer may include: authentication (single sign-on), presence and availability, user/device profile, directory services (both people and services), security management, notification, policy control, subscription, session control, service brokering, QoS management, access to PSTN, and potentially a large number of other reusable functions. The main criteria to use for classifying a capability as an ASI/ middle layer capability or service are (1) Actual or potential reusability across multiple applications; and (2) Service independence. Middle layer services may interface with the applications through northbound interfaces (using available transport), with the connectivity network through southbound interfaces (e.g., for managing QoS), and with the end users through web-based interfaces (again using available connectivity). In addition, middle layer service components may interact with one another.

In FIG. 7, connectivity services are provided by the lower three layers (collectively referred to as the connectivity layer), ASI services are provided by the middle layer, and application services are provided by the different applications (Services A through D). Furthermore, different modules or functional entities within each layer may need to communicate with one another. A module may also need to invoke another module through a remote invocation process. Other modules may need to pass data to one another at various points during the execution of their functions. Operations, Administration, Maintenance, and Provisioning (OAM&P) data may need to continuously be collected and exchanged. Thus, a communication and messaging infrastructure may also be provided to facilitate such interactions. The specifics of such a communication and messaging infrastructure are beyond the scope of the present invention and, therefore, will not be described further herein. However, any suitable mechanism for communication and messaging may be used.

The ASI according to some embodiments of the present invention may provide several advantages or capabilities over existing approaches. One capability of an ASI according to some embodiments of the present invention may be the access the end user can get to common infrastructure elements of the ASI in a way that is independent of any particular application. For example, the end user could access a directory service in ASI through a web interface to browse and locate people as well as applications and their descriptions (a supercharged white/yellow pages on people and applications). The end user could also access a profile service or a presence and availability server in ASI to create and edit his/her profile and availability, or can access a subscription service to subscribe to an application service and set up a billing profile, etc.

A further capability of an ASI according to some embodiments of the present invention may be that specific functions within the ASI layer could allow the end user to mix, match, and compose various application services (to the extent that they are compatible) to create more useful and complex interactions. The session control function within the ASI layer, for example, could allow a user to invoke a multimedia communication session with another user and arbitrarily add to the same session other parties (e.g., someone on a PC, or a cell phone) and other machines (e.g., a video server, a web server, or a gaming server). All feature interactions between and within such composite application services could be taken care of by ASI resulting in very useful enhancements to user's experience and productivity. It is also worth noting that the feature interaction management could be separated out from the session control function and made into a new middle layer function.

An ASI according to some embodiments of the present invention may also provide automatic and secure sharing of customer-specific data such as preferences, service data, and subscription data by multiple applications using the ASI layer.

Furthermore, an ASI according to some embodiments of the present invention may enable a unified and consistent experience for user's access to all categories of services and to the middle layer functions. ASI may enable a high degree of user control and customization. ASI may hide the complexities and inconsistencies the users would otherwise experience in dealing with different third party application providers by providing consistent common capabilities (somewhat analogous to a consistent "copy/cut/paste" capability across very different windows applications).

An ASI according to some embodiments of the present invention may allow application service providers to focus on their specific application development (their core competency) without being encumbered with development of support capabilities for their applications. Many if not all of the generic application support components would be provided through ASI.

The identification of the core ASI components may be based on analysis of common application infrastructure design requirements. ASI provides a shared infrastructure approach; components are designed to provide application service providers with reusable service enablers that they otherwise would have to develop as part of their applications. This shared services delivery approach may enable application providers to focus more resources on the development and delivery of application features and functionality. Development teams can focus on business logic and business processes primarily, without being too concerned about how to do authentication, billing, notification, and other service support functions provided by ASI.

Figure 8:
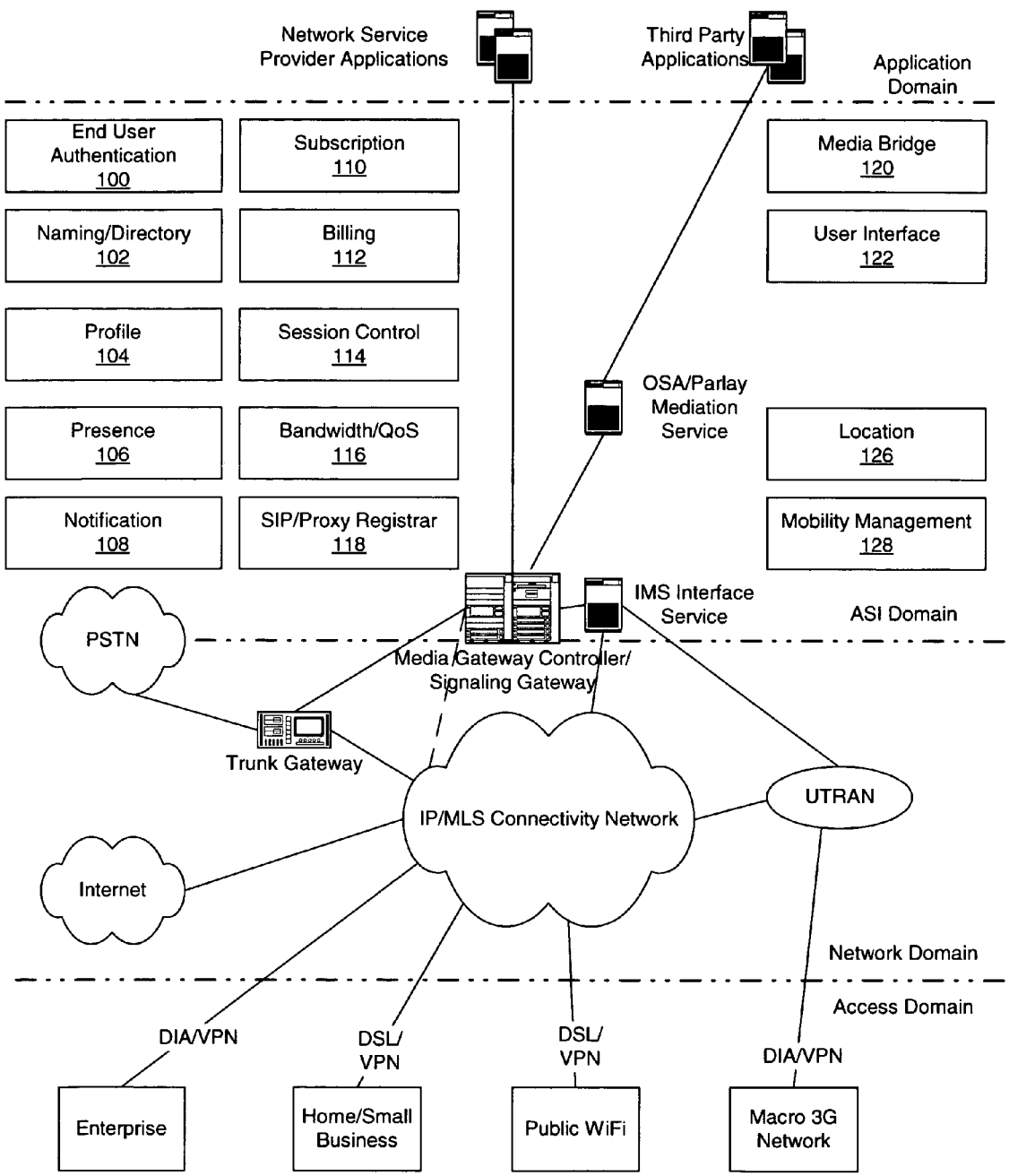
FIG. 8 is a diagram of a system incorporating an application services interface according to further embodiments of the present invention.

A particular embodiment of an ASI layer is illustrated in FIG. 8 as the ASI Domain. The common infrastructure elements provided by the ASI layer illustrated in FIG. 8 may be provided by modules executing on one or more servers or other data processing systems. The common infrastructure elements may include elements that are associated with use of the network and elements that are not associated with use of the network. As used herein, an element is associated with use of the network if it relates to establishing or controlling a connection to an end user as opposed to the content or application service accessed by the end user using the connection. An element is not related to use of the network if it does not relate to establishing or controlling a connection to an end user. Thus, where use of the network is only incidental to the function provided by a common infrastructure element, the element does not relate to use of the network. Some elements may fall into both categories. For example, a billing function that billed for connection time would be an element that is associated with use of the network whereas a billing function that billed for use of an application service would be an element that is not associated with use of the network. A billing function that billed for connection time and use of an application service would be an element that provides a function that is associated with use of the network and a function that is not associated with use the network.

As seen in FIG. 8, the ASI layer may include, but is not limited to, the following components:

Authentication Service (100)

The ASI Authentication Service 100 provides authentication, authorization and accounting features to allow applications to conduct transactions in a secure manner. Applications may rely on the Authentication Service to validate user and device credentials to ensure that only identified entities are able to access computing and network resources. In some embodiments of the present invention, the authentication of users may provide a service that is not associated with use of the network. For example, the authentication service may be provided to allow user access to application such that the users are authenticated to applications using the authentication service. A user may otherwise be authenticated to allow network access. In other embodiments of the present invention, the authentication service may provide a common infrastructure element that is associated with use of the network and a common infrastructure element that is not associated with user of the network, such as access to applications.

Naming Services and Directory Services (102)

ASI will provide a common information repository, registry service, and APIs to provide a list of available services from application service providers. The ASI directory service 102 manages information about service providers, service implementations, and service metadata, providing functions similar to Universal Description, Discovery, and Integration (UDDI) specification. This ASI metadirectory may or may not be UDDI compliant. Thus, the naming services and directory services may provide a common infrastructure element that is associated with use of applications provided by application service providers where use of the network is only incidental to the function of the common infrastructure element. Thus, the naming services and directory service may provide common infrastructure elements that are not associated with use of the network.

Profile Service (104)

The ASI Profile Service 104 provides a way for applications and users to access and manage the storage of shared user account information. Such information can include email addresses, phone numbers, scheduling information, service options, and user preferences (e.g., preferred mode of contact during a particular time interval). Profile entries typically refer to an individual or device, but could refer to almost any concrete object or abstract concept. The ASI Profile service will store the attributes associated with the entry; the exact set of attributes depends on the type of the entry. The profile service may provide a common infrastructure element that is not associated with use of the network in that the profiles may be used by the applications rather than to control network access. Alternatively, the profile service may provide a common infrastructure element that is associated with use of the network and a common infrastructure element that is not associated with use of the network, such as to provide profiles used by applications or other services, such as the billing service.

Presence Service (106)

The ASI Presence Service 106 aggregates user and device reachability information across applications and networks. Presence information is provided (via an API or other means) to approved requesters so that they can reach the user appropriately. This common, shared presence infrastructure serves as a basis for a variety of presence-based services, including presence enabled contacts (PEC), online gaming, push-to-talk, instant messaging, chat, content, and additional services. The presence service may be a common infrastructure element that is associated with the use of the network.

Notification Service (108)

The ASI Notification Service 108 provides a mechanism for applications to send messages to users and/or devices either on demand, or at a specific time. Messages are delivered to their targets based on user/device profile information. The ASI Notification service 108 will also perform content transformation if needed. The notification service may be a common infrastructure element that is associated with use of the network.

Subscription Service (110)

The ASI Subscription service 110 allows users to subscribe and manage their subscriptions to services. The subscription service 110 acts as clearinghouse to establish subscriptions, validating billing/credit information, sending subscription notices, and integrates with the ASI Billing Service 112 to establish the appropriate information to generate billing records. Thus, the subscription service may be a common infrastructure element that is not associated with use of the network but, instead, is associated with use of applications.

Billing Service (112)

The ASI Billing Service 112 provides a consolidated billing function across applications. Billing records are posted with the ASI service, which aggregates and processes the user charges across applications. The ASI Billing Service 112 compiles the information needed to produce customer bills. The billing service 112 may be associated with network use, such as to provide billing information for network access or may not be associated with use of the network. As discussed above, the billing service may provide a common infrastructure element that is associated with use of the network, a common infrastructure element that is not associated with use of the network or both.

Session Control Service (114)

The ASI Session Control Service 114 manages the overall context of a complex multi-party, multi-media, multi-application session. It is used by applications for resource management, to open and close connections of the selected type and quality, to determine user policies, to access resources associated with those connections (e.g., conference bridges), and to provide reliable end-to-end transmission associated with particular connections. The session control service may provide a common infrastructure element that is associated with use of the network.

Bandwidth/QoS Brokering Service (116)

The ASI Bandwidth/QoS Brokering Service 116 is responsible for allocating preferred service to users and/or applications as requested, and for configuring the network with the correct behavior for the defined service. The ASI BW/QoS Brokering Service 116 negotiates with underlying network entities on request for needed connections between endpoints pairs and submits connection instructions to elements in the IP/MPLS network via the DPE domain to make the connections happen. The BW/QoS Brokering Service 116 may include, for example, a bandwidth/QoS system such as described in U.S. patent application Ser. No. 10/719,270, filed Nov. 21, 2003, entitled "Methods, Computer Program Products, and Systems for Managing Quality of Service in a Communication Network for Application," the disclosure of which is incorporated herein as if set forth in its entirety. The bandwith/QoS service may provide a common infrastructure element that is associated with use of the network.

SIP Proxy/Registrar (118)

The SIP proxy service 118 processes incoming SIP messages to help route requests to a destination user's current location, authenticate and authorize users for services, implement provider call-routing policies, and provide features to users. The SIP registrar provides a registration function that allows users to upload their current locations for use by proxy servers. The SIP proxy/registrar services may provide common infrastructure elements that are associated with use of the network.

Media Bridge Service (120)

The Media Bridge Service supports the transport of video/audio/data streams between participants and service facilities in a conference. The media bridge service may provide a common infrastructure element that is associated with use of the network.

User Interface Service (122)

The User Interface Service 122 provides an interface that allows users to request service-related functionality. The user interface service may provide a common infrastructure element that is associated with use of the network and/or a common infrastructure element that is not associated with use of the network Location Service (126)

The Location Service 126 is used to determine an end user's physical position in order to manage mobility, possibly with the help of a Global Positioning System in the user equipment, once it has been determined that the user is active/available on that user equipment and wishes to be part of the communication.

Mobility Management Service (128)

The Mobility Management Service 128 provides call/session continuity as a device moves between circuit and packet network domains, or between different packet network domains. The user interface service may provide a common infrastructure element that is associated with use of the network.

Thus, for example, the authentication service 100, the user interface 122 and the subscription service 110 may provide common infrastructure elements that are not associated with use of the network while other common infrastructure elements, such as the presence service 106, the session control service 114 and the bandwidth/QoS brokerage service 116 provide common infrastructure elements that are associated with use of the network.

To determine additional components that may be suitable for including in an ASI layer and/or to define interactions between components in an ASI layer, a Model Driven Architecture (MDA) methodology may be utilized for the specification of ASI architecture. The determination of whether to include a particular piece of service-independent functionality in the ASI layer may be independent of whether the functionality is associated with use of the network or not but may be made based on whether there is sufficient use of the functionality across the expected application services utilizing the network to justify incorporating the functionality into the ASI layer as a common infrastructure element.

MDA relies on the notion of a Platform Independent Model (PIM) that does not rely on specific implementation technologies. A Platform Independent Model may be developed in MDA by using a profile (i.e., a subset) of the Unified Modeling Language (UML) called Executable UML (XUML). An XUML model compiler would then turn the constructed XUML model into an implementation using a set of decisions about target hardware and software environment.

ASI—Specific Analysis and Modeling Steps

Figure 9:
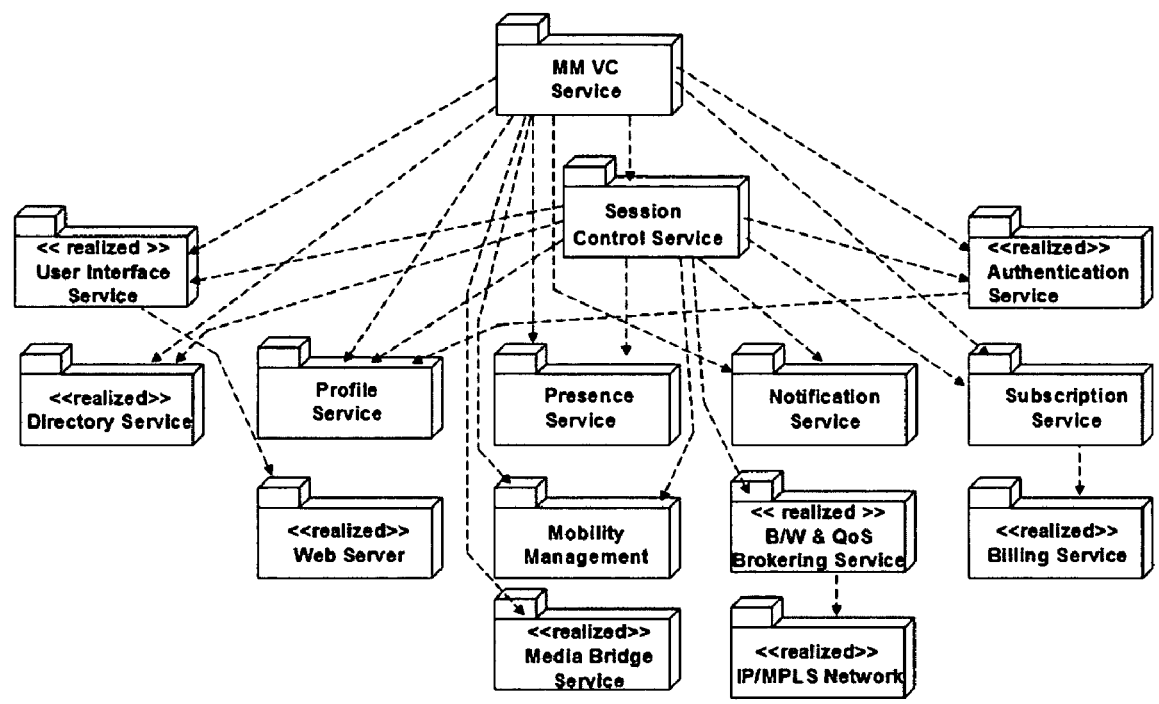
FIG. 9 is a domain chart for a multi-media conferencing application illustrating part of the methods of developing application services for inclusion in an application services interface according to some embodiments of the present invention.

Analysis may begin by developing a domain chart for each major application that is going to be offered by NGN. Each domain is a subject matter area, an autonomous world inhabited by a set of conceptual entities. Each domain, (except the application domain) can provide services to other domains and in turn can use the services of other domains. Note that this is a different structure from the vertical hierarchy typical in OSI layered protocol models. Domains and pair-wise relationships between domains are shown in a domain chart. For example, FIG. 9 shows a domain chart for a multimedia video conferencing application. Each package symbol represents a domain, and the dotted lines are domain dependencies known as "bridges". For example, the domain chart shows that the multimedia conferencing application relies on the availability of the session control service. However, the conference service has no knowledge of the concepts embodied within the "session control service" domain. In fact, the session control service could be replaced by a new version of the service with no impact on the multimedia conferencing application, provided that the same services are provided to it by the new session control service.

The next step in the MDA creation process is development of use cases. Use cases formally capture the functional or behavioral requirements on the system. Systems respond to requests from external entities called actors; each collection of responses is a use case. Although first passes at uses cases can span multiple domains, in order to build an executable UML model, such complex scenarios should be decomposed into multiple (and simpler) uses cases, each corresponding to and using the vocabulary of a single specific domain. By using such vocabulary, use cases help the analyst build appropriate abstractions in each domain. Use cases can be at a very high level ("sky level") to capture the highest level requirement, or at a very low level ("mud level") to capture a detailed functional requirement in the core of the system. The most useful level of abstraction in MDA makes use of intermediate level uses cases (so called "bird level" or "sea level"). For example, a sky level use case in multimedia conference might have a user initiating a conference with multiple other participants. A bird level use case in the application could be the user "inviting" another participant to an existing conference, or "suspending" a conference. While uses cases show actors and activities, they generally don't show any context to those activities or how the use cases are sequenced to carry out the activities. To show that, another UML diagram known as the activity diagram is used. Each oval in an activity diagram corresponds to a use case, and the connecting arrows show the sequence (see the activity diagram for Multimedia Conferencing in the next section). In order to visualize activities that involve use cases initiated by different actors, the activity diagram can be divided into "swimlanes".

After gathering and understanding requirements for a domain (through use cases, textual requirements, activity diagrams, etc.), appropriate abstractions are created and detailed decisions are made about the internal workings of the domain. Note that MDA provides a "clear-box" approach to architecture specification, in contrast to a "black-box" approach that only focuses on interface (API) specification and does not get involved in specifying internal abstractions and their relationships inside the domain. Equipped with a domain chart and a set of use cases for a domain that needs to be analyzed, the domain can finally be analyzed and modeled (note though that some domains are already "realized" and implemented, and therefore do not need further analysis or modeling).

A domain may include real and conceptual entities. Like entities are abstracted and called classes. A class represents an abstraction that captures the "likeness" of entities within a domain: likeness of properties (attributes), relations with other entities (associations), and behavior (states). The result of the abstraction process is captured in a class diagram. In the course of developing a class diagram (and subsequently state diagrams for active classes), changes to the domain chart and use cases may be found necessary. This results in an iterative process until the entire system model is deemed complete and internally self-consistent.

Some of the classes identified in the class diagram of a domain are static classes, i.e., pure repositories of data. Other classes not only hold data but also exhibit a dynamic behavior that drives them through various stages in their lifetime. The collection of such stages is a lifecycle. A state machine formalizes the lifecycle of a class in terms of states, events, transitions and procedures with their actions. Each state in the state diagram has an associated procedure that takes as input the data associated with the event that triggered entry into the state. Such a procedure consists of a set of actions, each of which carries out some computation, data access, signal and event generation, and so on. Actions are like high level code (similar to IDL) and make no assumptions about software structure or implementation.

After class and state modeling is complete for a domain and models are verified through simulation, the models can be fed into a "model compiler" that would turn an executable UML model into an implementation using a set of decisions about the target hardware and software environment. The process is almost fully automated and generated code can be run on the target platform. To generate production code, some iteration between modeling, verification and execution and some adjustment of target environment decisions may be necessary.

Note that the use of a model compiler is not necessary for an implementation of this invention—middle layer elements can be developed from the UML artifacts using any desired development methodology.

Modeling the ASI Layer

Using the methodology discussed above (encompassing domain charts, use cases, activities, classes, state models) a coherent view of a model for the ASI layer that supports application services residing on network service provider controlled and third party Application Servers may be developed. The derivation of the model can be summarized in the following steps. Note that the methodology is iterative—for example, work on an activity diagram in step 2 might result in returning to step 1 to add another domain to the system.

Step 1. Scoping the ASI layer: Identify ASI layer functionality and services provided to the layer above including identifying the set of application services to be supported by the ASI layer; and identify the set of domains resident in the ASI layer.

Step 2. Application services modeling: Model each common application service identified in step 1 including writing a set of use cases, developing a domain chart and developing an activity diagram.

Step 3. Domain modeling: Identify the domains needed for each application service, find the union of the above sets of domains in order to identify the full list of domains needed in the ASI layer, write a mission statement for each domain and develop a class diagram for each domain.

Note that since the usage takes place in the Application Domain and the ASI domain (i.e., above the Network and Access Domains), no knowledge of the underlying network technology is assumed or needed. In the interest of clarity, in the example described herein, the entire analysis at each stage of the development is not described, instead, a single application service (Multimedia Conferencing) and two key ASI domains (the Session Control Service and Presence Management Service) will be used as examples.

Scoping the ASI Layer (UML Step 1)

This step involves requirements gathering, primarily in the form of a representative set of application services that will exercise the capabilities of the ASI layer as well as a set ASI domains supporting them. The set of application services selected to be supported by the example ASI layer was as follows.

Video on Demand: This service allows a user to view audio/video source material using streaming or buffer and play technology.

Multimedia Conferencing: This service allows a user to participate in a voice/video/data conference. Functionality such as join/leave, invite, suspend/resume are supported. More than any other service considered here, the Multimedia Conferencing service exercises the session control functionality supported by the ASI domain.

VoN: This service provides a user with emulated POTS service enhanced with data features using an underlying IP network as opposed to TDM technology. In addition, a number of hybrid services may be provided, such as click-to-dial.

Messaging: This service allows the user to retrieve, compose, send, and forward messages via the TUI and/or GUI (via store and forward, non-real time).

Enhanced Web Browsing: This browsing service provides profile-based filtering and proactive content notification and delivery based on content access patterns and preferences.

Cellular/Wireless LAN Telephony: This service provides a user with a mobile device, a single telephone number, and associated network services, which allow the user to make and receive calls, and support seamless mobility and handover, within and while moving between, circuit switched cellular systems and IP environments provided through Wireless LAN technology.

A number of domains in the ASI layer can be considered "realized", i.e., alredy developed and available as modules for integration into the architecture. Examples of such domains are media bridge service and billing service. A possible set of unrealized domains to be provided in the ASI layer are: Session Control service, Mobility Management Service, Presence Management Service, Subscription Service, Profile Service, Location Service, and Notification Service. The resulting set of realized and unrealized domains is pictured in FIG. 9.

Application Services Modeling (UML Step 2)

This step involves iterating through the representative application services to determine their needs from the ASI layer and domains resident therein.

Use Cases

Use cases are developed for each of the Application Services defined in Step 1. Use cases are typically done using a UML tool designed for that purpose. A use case diagram for Multimedia Conferencing appears in FIG. 10.

The representative application service has three types of users:

A controlling user that initiates conferences (on-demand or scheduled for a future time) as the conference leader, invites other users, and can suspend/resume a conference, drop users if necessary, and end a conference. Typically, a controlling user also ends up paying for the service.

A passive user that has a much more limited set of capabilities, basically being able to respond to an invitation to join a conference, and to leave a conference when desired.

A scheduler that acts at the behest of the controlling user to schedule (or cancel) future conferences and trigger conference startups at the appropriate times.

Many additional conferencing capabilities are possible. Changes to the basic conferencing model (e.g., adding application sharing or moving from a centralized to a distributed model with client-based stream mixing) would impose new requirements that would further exercise the definition of the ASI layer. Many basic and extended capabilities that might be imagined for our service are not that intrinsic to this particular service but in fact can be handled via defined ASI layer capabilities. Some examples of enhanced Multimedia Conferencing features associated with the different ASI domains are as follows.

Authentication and subscription services may enable a family member to join a conference when a parent's credentials are the basis of the main account with the provider, or subscribe to the conference service for a limited time, e.g., during a trial period.

A multimedia bridge service may provide audio and video mixing capabilities such as have reasonably good video and audio connections to the other participants and be able to view the other participants in "Hollywood Squares" fashion subject to availability.

A billing service may have the controller pay for all conference legs (or have each participant pay for their leg to the conference bridge), be billed for a conference, including monthly recurring charges and per-conference usage fees, and/or set up a billing account with the provider or a third party.

Profile and directory services may set LIP preferences for how to be notified of an active or soon-to-be-active conference based on where the user is reachable, be able to register the most likely conference participants using "friendly names" rather than network addresses or telephone numbers, and/or be able to specify choices on number of video windows and their contents (e.g., self, current speaker, conference room view).

A presence service may be notified of a soon-to-start conference via an SMS sent to a handheld device.

A session control service may be able to use a shared application such as white board or PowerPoint, and/or be able to have side-bar discussions with a subset of the participants.

Figure 10:
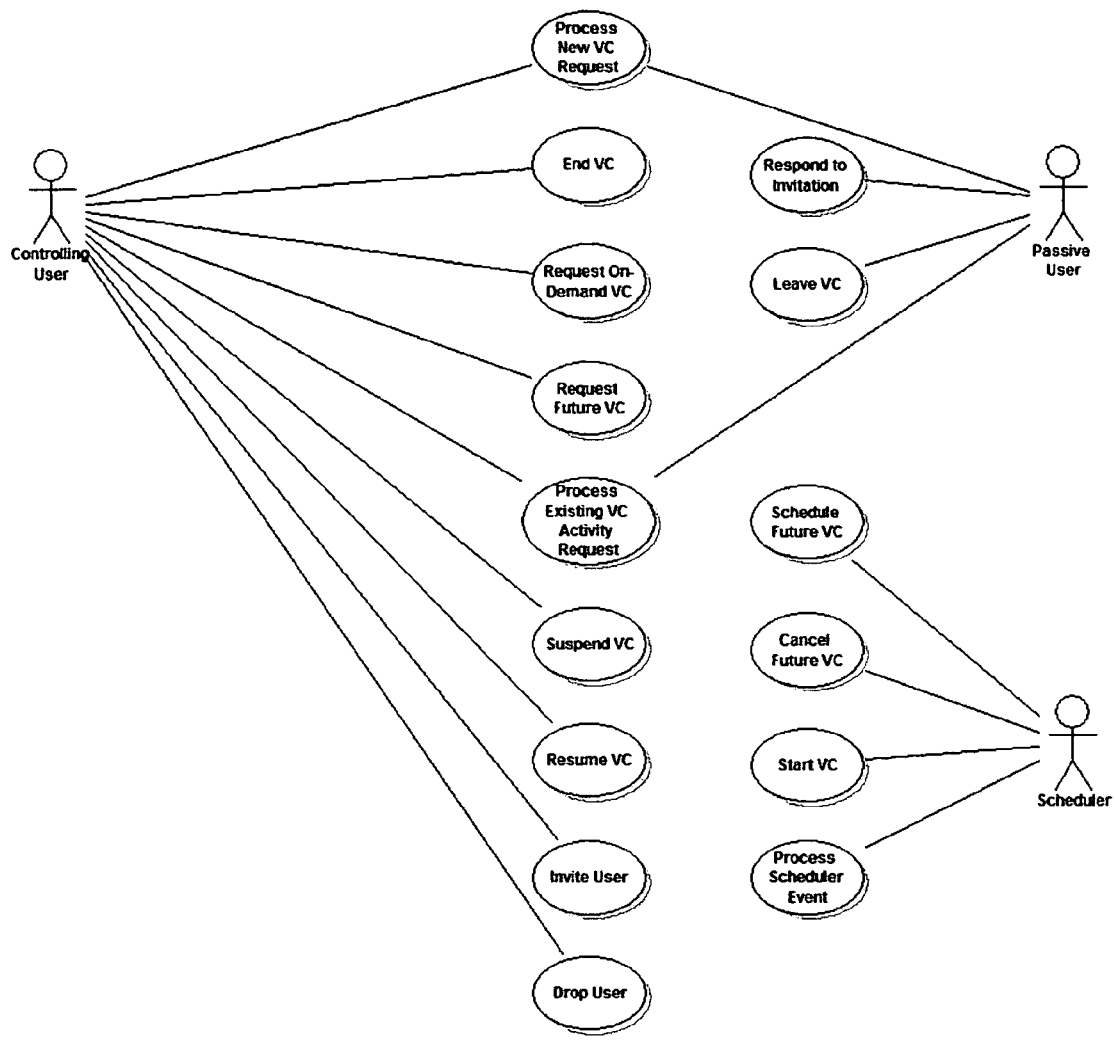
FIG. 10 is a use case diagram for the multi-media conferencing application illustrating part of the methods of developing application services for inclusion in an application services interface according to some embodiments of the present invention.

However, the basic use cases illustrated in FIG. 10 are sufficient as a very basic application service to exercise our modeling of the ASI layer.

Each application from step 2 is examined to determine the set of ASI domains that it needs, and a domain chart is drawn. Since Multimedia Conferencing is provided as the representative application service, the domain chart for that service shown in FIG. 9 is discussed in further detail below.

The domain chart resembles a tree, but it does not quite fit the IT definition of a tree since a leaf can be a child of a parent and a grandparent (or higher-level ancestor) simultaneously. The Session Control service is shown directly below the application service, and this will typically be the case with other domain charts because of its central role in managing the overall context of a session involving this service (and possibly other services simultaneously). As a result, there are more links emanating from the Session Control service than from any other (save for the application service itself). As mentioned earlier, in the present example, a number of the services are considered "realized", i.e., they are already modeled and implemented with known capabilities that they can offer to application service and ASI services. For the present example, the ASI domains requiring new modeling are: Session Control, Subscription Service, Presence Service, Notification Service, and Mobility Management.

Figure 11:
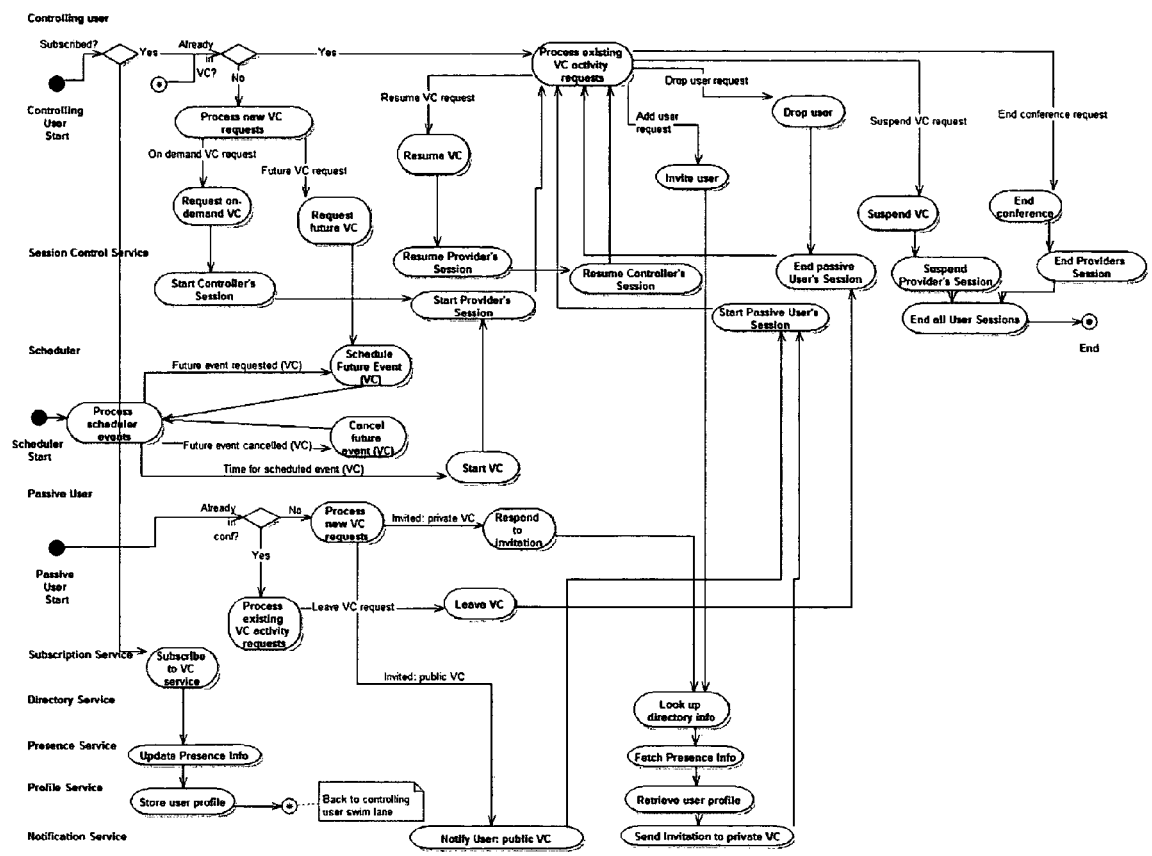
FIG. 11 is an activity diagram for the multimedia conferencing application illustrating part of the methods of developing application services for inclusion in an application services interface according to some embodiments of the present invention.

An activity diagram is created for each application service. FIG. 11 contains a representative example for Multimedia Conferencing. Note that the diagram shows a "swimlane" for each element of the ASI layer; in addition, there is a swimlane for the service user (or in this case, service users since there are three types). Each of the user swimlanes contain all of the relevant use cases for that user as developed in step 2 above. The use cases for the ASI elements appear in the corresponding swimlanes—these can be presumed to be a subset of the full set of use cases for the corresponding ASI element, since they are only those known to be needed thus far for the application service under study. As part of the iterative nature of UML modeling, identification of new use cases for a particular ASI domain will result in further examination and expansion of the modeling on that domain.

Each user swimlane in the activity diagram has a clearly identified starting point from which the flow proceeds and each flow can be tracked through to an ending point. Decision boxes and/or "Processing xxx" return points lay out the logic allowing the diagram to model various ways in which the service flow can proceed (e.g., after a "drop user" request is processed, the flow returns to "Processing existing VD activity requests" in case another user needs to be dropped, or the conference needs to be suspended, etc.).

Although it is not shown, the application service has a key role in the activity diagram that is not visible to the observer. The application service can be thought of as "hovering over the diagram" in the sense that any transition shown on the activity diagram actually transits through the hovering application service. This way of presenting the activity is preferable to including the application service as an additional swimlane, since the readability of the diagram would be compromised by having all flows pass through a "process activity transition" in a new swimlane.

As an additional simplifying assumption, the diagram assumes that the user has already been authenticated by the ASI layer (using the authentication service therein but not shown on this diagram). For simplicity/readability, only the most rudimentary activity flows involving the subscription service, directory service, and other services are shown.

Domain Modeling (UML Step 3)

In this step of the analysis, all of the domains needed in the ASI layer are gathered and each domain is investigated by developing a mission statement and class diagram for it.

The set of domains needed for each application service is identified and the union of those sets is identified in order to identify the full list of domains needed in the ASI layer. The domains of interest are the following: Session Control, Subscription Service, Presence Service, Notification Service, and Mobility Management.

Domain Mission Statements are also developed. The mission statements are simple definitions of the role of each domain. In the present example, the mission statements are as follows (note that these statements are drawn from of the ASI layer component definitions provided above).

Session controller. Manages a particular service session at the request of an application service (or services). Views a service session as comprising a provider service session and related user service session corresponding to users in the overall session. Can handle controlling and/or passive users that have potentially different service capabilities offered to them. Manages a "leg" for each user service session (note that a particular user can have several associated legs, e.g., when connected to a conference via a PC client and a handheld computer simultaneously).

Subscription Service. Allows users to subscribe to services such as multimedia conferencing, and provides the Billing Service with appropriate information to set up billing records.

Directory Service. Provides a list of what is available from this service provider as well as UDDI, metadirectory, and passive database functionality.

Presence Service. Maintains user reachability information and provides it to approved requesters so that they can reach the user appropriately.

Bandwidth/QoS Brokering Service. Negotiates with underlying network entities on request for needed connections between endpoint pairs and submits connection instructions to elements in the IP/MPLS network via the DPE domain to make the connections happen.

Profile Service. Maintains user and service data including user preferences and service options.

End User Authentication Service. Authenticates user credentials against information in the profile service and returns an allow/deny response.

Billing Service. Provides call or service detail records (both per-service-instance and (recurring charges) and sends the information to downstream bill generation systems.

Media Bridge Service. Provides an audio and/or video bridge that supports the transport of video/audio/data streams between participants and service facilities.

User Interface Service. Provides an interface between the service user and the service that allows a user to request service-related functionality.

Notification Service. Notifies users of service-related events.

Web Server. Serves files forming web pages to web users.

The mission statements just developed are the starting point for creation of class diagrams for each domain that can eventually be used to support service development. The purpose of this step is to perform an analysis of each domain to ensure that it provides a useful, reusable, and separable set of functionality that is a candidate for independent development (followed by inclusion in the ASI layer as a useful infrastructure block). Each class diagram consists of a set of classes that are linked by various UML relationships including associations (e.g., "a building is associated with its owner"; associations are numbered $R_1, R_2, \ldots$) and inheritance (i.e., an "is a" relationship such as "a beagle is a dog"). Exemplary class diagrams are illustrated in FIGS. 12 and 13.

Each association shows the cardinality and a role at either end. Thus the association between "User Service Session" and "Leg" in FIG. 12 is labeled to show that the User Service Session has 0 or more related legs, while the leg "is assigned to" exactly 1 User Service Session. Several other often-used cardinalities are possible, including "0", "0,1", and "1 . . . *".

Figure 12:
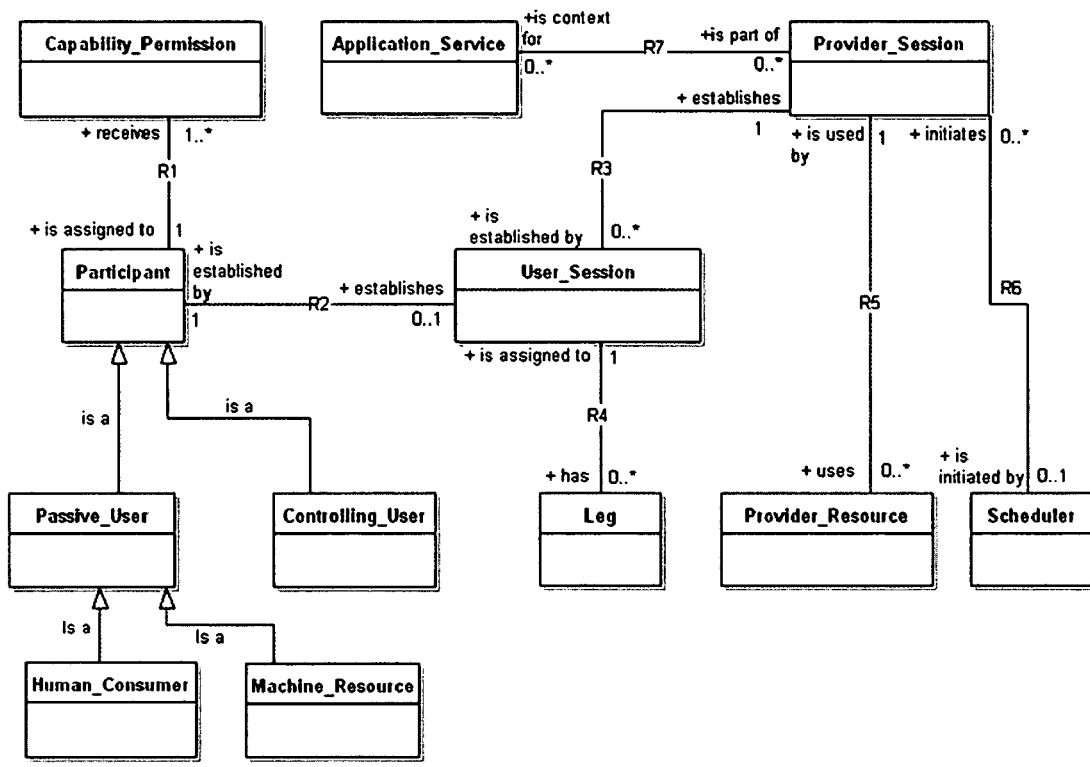
FIG. 12 is diagram of a class model for a session control service illustrating methods of developing application services for inclusion in an application services interface according to some embodiments of the present invention.
Figure 13:
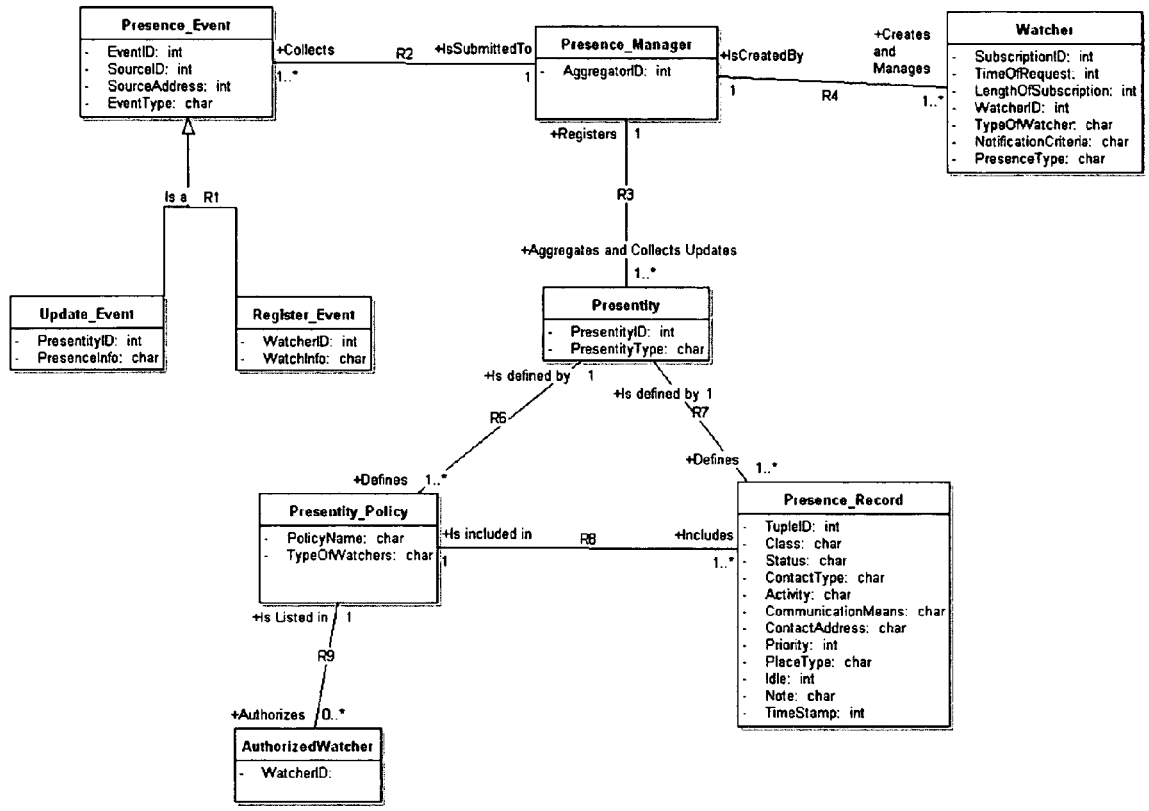
FIG. 13 is a diagram of a class model for a presence management service illustrating methods of developing application services for inclusion in an application services interface according to some embodiments of the present invention.

An example of an inheritance relationship appears in FIG. 12 where the class diagram specifies that there are two types of users (controlling and passive) that both inherit the properties of the user class via an "is a" relationship.

Class Diagram 1: Session Control Service

FIG. 12 is an example class diagram for the Session Control Service. As indicated above, the Session Control Service has a central role in maintaining the overall context of sessions supporting applications (regardless of the particular application services that are running).

The following thirteen use cases can be extracted from the development of the activity diagram for multimedia conferencing; these use cases have been found to be sufficiently adaptable to support many other application services.

For the Provider Session, the abilities to start, end, suspend, and resume provider service sessions are needed. A provider session is started at the request of a user session (corresponding to a Controlling, Active, or Passive user and done with intervention from the "hovering" application service), and ends when it is no longer needed (e.g., a conference has ended or a web browser is closed). Ending the provider session results in transition to a use case of end all user sessions associated with that provider session. Note though that ending a particular user's session in this way does not imply that the user is completely disconnected from the network; indeed, the user is most likely still authenticated and active from the perspective of the ASI layer, and may have other user sessions active with other application services.

Controller's session: This user needs the start and end controller session use case to allow a controlling user access to the service. Suspend and resume use cases are also needed in the event that the controller wishes to suspend participation at one location at a particular time and resume participation at a later time and potentially from another location. In addition, the controlling user may wish to leave (i.e., disassociate itself from the provider session) temporarily without causing the overall session to end (e.g., "I'm going out to lunch, but you folks can continue discussing the project").

The Passive User's Session needs the start, end, suspend, and resume use cases even though these less privileged users don't need to worry about the provide session ending just because they have disconnected.

These and other considerations led to the Session Control service class model shown in FIG. 12. Note that the Session Control service's ability to manage several application services in the context of a single session is modeled by relationship R7.

Note that a single instance of the Provider Session exists per overall session, and that this provider session can be initiated either by a user session or by a scheduler. The user's ability to engage service features is modeled by a set of capability permissions, which are basically tokens set up by the application service developers. An example of a capability permission might be "conference leadership"—initially, this token might be given to the controlling user; however, at some point the conference leader might want to pass the token to another participant to allow them to moderate a portion of the conference in her place.

A provider resource class is used to model various resources that might be made available to provider session instances that need them. An example of a provider resource is an A/V conference bridge.

Class Diagram 2: Presence Management Service

FIG. 13 is an example class diagram for the Presence Management Service. Presence is a service that allows a party to know the ability and willingness of the other party to participate in a communication session even before an attempt is made to communicate. A user or an application interested in receiving presence information (a Watcher) for another user (Presentity) can subscribe to his/her presence status and receive Presence status notifications from the Presence service. FIG. 13 illustrates an example of the Presence service domain. A single Presence Service Manager exists that serves a collection of Presentities. A presentity is an entity whose presence information is of interest. The Presence Service Manager receives updated Presentity status according to Presence Events. The Presence Service Manager is responsible for handling Presence Subscription requests from Watchers and notifying them about the Presence status of the Presentities. The Presence Service Manager is responsible for receiving and handling Presence subscriptions from Watchers; receiving and aggregating Presence Events; composing the Presence status from the fragments of presence data; and notifying all subscribed Watchers when the Presence status of a Presentity in which they are interested changes.

Presence Events are generated by the client devices/software that the Presentity uses and that collect Presence data (for example, phone, cell-phone, PDA, soft PC client) as well as network elements (for example, a geo-location system or a wireless HLR servers). Multiple Presence Events are processed by the Presence Service Manager and composed into a coherent representation of presence for a particular Presentity. The composing process to create the single presence instance may involve complex transformations of presence information such as modifying the presence information from one presence source based on information from another presence sources. The Presence Service Manager collects and composes the presence information based on policies and records defined by the Presentities. Presentities define the type of Watchers authorized to view certain presence information. The presence information in turn is organized by the Presence service into Presence Records representing types of communication, types of device, status, etc. based on input from the Presentities.

Multiple Watchers can subscribe to receive updates of the presence status of a given Presentity. Watchers specify the identity of the Presentity that they are interested in using the Presentity's identifier (e.g., the Presentity's URL). The Presence Service manages presence information for a number of domains, with each domain being referenced through the Presentity's identifier. Each subscription received from a Watcher will result in a creation of a Watcher instance associated with an active subscription. The Presence Service Manager collects watcher information to enable the Presentity to obtain information about the watchers that have subscribed to Presentity's presence information. Each change in the status of the Presentity will then result in the generation of a notification by the Presence Service Manager to all subscribed Watchers. Before the subscription to presence information is accepted, the Presence Service Manager verifies the identity of the watcher against the list of authorized watchers defined by the Presentity.

The diagrams of FIGS. 7 through 13 illustrate the architecture, functionality, and operation of possible implementations of systems, methods and computer program products according to various embodiments of the present invention. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of providing services for an application middle layer between a plurality of different applications and a network layer of a next generation network, comprising:
   determining common services used by the plurality of different applications irrespective of whether the common services are associated with use of the next generation network;
   abstracting the common services to provide a common interface to the services to the plurality of different applications; and
   incorporating the abstracted common services into the application middleware as common infrastructure elements;
   wherein the steps of determining common services, abstracting the common services and incorporating the abstracted common services comprises:
      scoping the middleware layer;
      modeling the middleware services;
      modeling domains for the middleware services; and
      generating services provided by the middleware layer based on results of scoping the middleware layer, modeling the middleware services and modeling domains for the middleware services;
   wherein scoping the middleware layer comprises:
      identifying functionality and services provided to the applications;
      identifying a set of services supported by the middleware layer; and
      identifying a set of domains resident in the middleware layer;
   wherein modeling the middleware services layer comprises:
      modeling each of the identified services supported by the middleware layer;
      developing a domain chart;
      developing an activity diagram; and
   wherein modeling domains comprises:
      identifying domains needed for each identified service provided to the applications;
      determining a union of the identified domains to identify a list of domains need for the middleware layer;
      developing a mission statement for each domain; and
      developing a class specification for each domain in the union.

* * * * *